United States Patent [19]

Davis

[11] Patent Number: 5,102,560

[45] Date of Patent: * Apr. 7, 1992

[54] ORGANOSILICON POLYMER HAVING NONRANDOM CROSSLINKAGES USEFUL IN ENHANCED OIL RECOVERY USING CARBON DIOXIDE FLOODING

[75] Inventor: Bruce W. Davis, Fullerton, Calif.

[73] Assignee: Chevron Research and Technology Company, San Francisco, Calif.

[ * ] Notice: The portion of the term of this patent subsequent to Feb. 5, 2008 has been disclaimed.

[21] Appl. No.: 615,953

[22] Filed: Nov. 20, 1990

Related U.S. Application Data

[62] Division of Ser. No. 335,009, Apr. 7, 1989, Pat. No. 4,989,674.

[51] Int. Cl.$^5$ .............................................. E21B 43/22
[52] U.S. Cl. .............................. 252/8.554; 252/8.551; 166/273; 166/275; 166/274
[58] Field of Search ...................... 528/10, 12, 21, 43; 166/270-275, 303; 252/8.551, 8.554

[56] References Cited

U.S. PATENT DOCUMENTS

| | | | |
|---|---|---|---|
| 3,017,385 | 1/1962 | Sprung et al. | 528/43 |
| 3,017,386 | 1/1962 | Brown et al. | 528/43 |
| 3,162,614 | 12/1964 | Katchman | 528/43 |
| 3,294,737 | 12/1966 | Krantz | 528/43 |
| 3,450,672 | 6/1969 | Merrill et al. | 528/12 |
| 3,624,030 | 11/1971 | Pruvost | 528/31 |
| 4,609,043 | 9/1986 | Cullick | 166/274 X |
| 4,800,957 | 1/1989 | Stevens, Jr. et al. | 252/8.554 |
| 4,828,029 | 5/1989 | Irani | 166/274 X |
| 4,852,651 | 8/1989 | Davis | 166/273 X |
| 4,913,235 | 4/1990 | Harris et al. | 166/273 |

OTHER PUBLICATIONS

Macromolecules vol. 11, No. 4 Jul.-Aug. 1978 Author: James E. Mark *Conformations and Spatial Configurations of Inorganic Polymers* p. 627-633.
Rigid-Chain Polymers Hydrodynamic and Optical Properties in Solution Author: V. N. Tsvetkov pp. 174-189 (1989).
Journal of Polymer Science: Part C No. 1, pp. 83-97 (1963) Author: John F. Brown, Jr. Double Chain Polymers and Nonrandom Crosslinking.
Macromolecules 1980, 13, pp. 1260-1264 Author: Jose M. Sosa Surface Characterization of Methylsilsesquioxane-Phenylsilsesquioxane Copolymers.
Journal of American Chemical Society (1946) Author: Winton Patnode and Donald F. Wilcock vol. 68, pp. 358-362 *Methylpolysiloxanes*.
Journal of American Chemical Society 82:6194 (1960) vol. 82 pp. 6194-6195 Author: J. F. Brown.
Journal of American Chemical Society (1971) p. 4599 Author: C. L. Frye, J. M. Klosowski Concerning the So-Called "Ladder Structure" of Equilibrated Phenylsilsesquioxane.
Vsokomolekulyarnye Soyedineniya vol. 20, No. 10 (series A), 1978 V. V. Korshak Polydimethylsiloxanes With Methyl and Vinyl Silsesquioxane Units In The Chains* K. A. Andrianov, et al.

Primary Examiner—John S. Maples
Assistant Examiner—C. Sayala
Attorney, Agent, or Firm—Edward J. Keeling; Ernest A. Schaal

[57] ABSTRACT

A polymer is disclosed that is useful in increasing the viscosity of carbon dioxide. That polymer comprises an organosilicon polymer having nonrandom crosslinkages that enhance backbone rigidity. Preferably, that polymer is a polyalkylsilsesquioxane. That polymer can be used in a method for recovering oil from an underground oil-bearing earth formation penetrated by an injection well and a producing well, in which method carbon dioxide is injected into the formation to displace oil towards the producing well from which oil is produced to the surface. The viscosity of the carbon dioxide injected into the formation is increased at least three-fold by the presence of a sufficient amount of the polymer and a sufficient amount of a cosolvent to form a solution of the polymer in the carbon dioxide.

11 Claims, No Drawings

ORGANOSILICON POLYMER HAVING NONRANDOM CROSSLINKAGES USEFUL IN ENHANCED OIL RECOVERY USING CARBON DIOXIDE FLOODING

This is a division of application Ser. No. 335,009, filed Apr. 7, 1989, now U.S. Pat. No. 4,989,674.

The present invention relates to an organosilicon polymer having nonrandom crosslinkages that enhance backbone rigidity, said polymer being useful in increasing the viscosity of carbon dioxide; to new compositions of matter comprising carbon dioxide and a viscosifying amount of a mixture of cosolvent and that organosilicon polymer having nonrandom crosslinkages; and to a method of recovering oil from underground subterranean formations using those new compositions of matter.

BACKGROUND OF THE INVENTION

In newly discovered oil fields, oil usually will be recovered by the oil flowing from a producing well under the naturally occurring pressure of the fluids present in the porous reservoir rocks. That naturally occurring pressure decreases as the fluids are removed. This phase of production, called primary production, recovers perhaps 1% to 20% of the oil present in the formation. Secondary recovery methods (e.g., waterflooding) are used to recover more of the oil. In these methods, a fluid is injected into the reservoir to drive additional oil out of the rocks. Waterflooding has limitations. Since the water is immiscible with oil, as the water displaces the oil the oil remaining in the reservoir reaches a limiting value known as "the residual oil saturation" and the oil stops flowing. There is a strong capillary action which tends to hold the oil in the interstices of the rocks. The amount of oil recovered by secondary techniques is usually from about 5% to 30% of the oil initially present.

In recent years, more attention has been directed to enhanced oil recovery or tertiary recovery methods. These tertiary recovery methods are used to recover the residual oil by overcoming the capillary forces which trap the oil during waterflooding. For example, it has been suggested to add surfactants to the flood to decrease the interfacial tension and thus allow oil droplets to move to producing wells.

Secondary or tertiary recovery of oil is also possible by the miscible fluid displacement process. A number of carbon dioxide floods have been tried in the U.S. The carbon dioxide tends to dissolve in the oil, which swells with a consequent decrease in viscosity and improvement in the flow to producing wells. The carbon dioxide also extracts light hydrocarbons from the oil and this mixture of carbon dioxide and light hydrocarbons can, in some cases, reach a composition that will miscibly displace the oil.

This carbon dioxide-rich phase characteristically has a lower viscosity than the oil and tends to finger through the formation. Early carbon dioxide breakthrough is undesirable since reservoir sweep is reduced and expensive separation procedures are required to separate and recycle the carbon dioxide.

Harris et al. report in their application (U.S. Serial No. 073,791) a means of increasing viscosity for the carbon dioxide thirty-fold or more using cosolvents, along with certain defined polymers having a solubility parameter of close to 6.85 $(cal/cc)^{\frac{1}{2}}$ [14.0 $(J/cc)^{\frac{1}{2}}$]or less and having electron donor groups such as ether, silyl ether, and tertiary amine. Those defined polymers include polysiloxanes and polyvinylethers.

SUMMARY OF THE INVENTION

The present invention is based on the discovery that organosilicon polymers having nonrandom crosslinkages are especially useful in increasing the viscosity of carbon dioxide because of those polymers' high intrinsic viscosities and because their solubility parameters are relatively close to carbon dioxide at densities above the critical density. Preferably, the nonrandom crosslinkages form double-chained segments. More preferably, the polymer is a polyalkylsilsesquioxane. Preferably, the polyalkylsilsesquioxane is either a polymethylsilsesquioxane or a polysilsesquioxane having methyl side groups and side groups selected from the group consisting of ethyl, phenyl, and combinations thereof.

In one embodiment of the present invention, the polymer is used in a method for recovering oil from an underground oil-bearing earth formation penetrated by an injection well and a producing well. In that method, carbon dioxide is injected into the formation to displace the oil towards the producing well. The viscosity of that carbon dioxide is increased at least three-fold by the presence of a sufficient amount of the polymer and a sufficient amount of a cosolvent to form a solution of the polymer in the carbon dioxide.

DESCRIPTION OF THE PREFERRED EMBODIMENTS

In its broadest aspect, the present invention is based upon the discovery that some organosilicon polymers having non-random crosslinkages have estimated solubility parameters similar to the polysiloxanes of Harris et al. but have much higher intrinsic viscosities. Therefore, they would be ideally suited for increasing the viscosity of carbon dioxide.

It is well known that the solution properties of a polymer can be predicted. For instance, the relative viscosity of a solution $\eta_r$ is defined as the viscosity of the solution divided by the viscosity of the solvent $\eta_s$, as shown by the following equation:

$$\eta_r = \eta/\eta_s \tag{1}$$

The value of the relative viscosity can be approximated by the following equation:

$$\eta_r = 1 + [\eta]_m c + k_H [\eta]_m^2 c^2 \tag{2}$$

where:

$[\eta]_m$ is the mass-based intrinsic viscosity of the polymer, c is the concentration of the polymer, and $k_H$ is the Huggins constant which is relatively independent of polymer. ($\approx 0.4$)

Thus, by using polymers having high intrinsic viscosities, one can dramatically increase the viscosity of the carbon dioxide solution without increasing the molecular weight of the polymer. Furthermore, as the intrinsic viscosity is increased, the polymer concentration can be reduced and still attain the same viscosity, which makes the use of that polymer more economical.

The intrinsic viscosity of a polymer is a function of the molecular weight of that polymer. The relationship between a polymer's intrinsic viscosity and its molecular weight is given by the Mark-Houwinck-Sakurada equation:

$$[\eta]_m = K(d)M_w^\lambda \quad (3)$$

where:
K(d) is dependent upon the d-dimensional volume of the repeating unit of a linear polymer,
$M_w$ is the weight-average molecular weight, and
$\lambda$ is dependent upon the dimensionality of the polymer.

Values of "K" and "$\lambda$" have been experimentally determined for a variety of polymers, and are reported in a variety of sources (e.g., *Polymer Handbook*, eds. J. Brandrup and E.H. Immergut). The value of "$\lambda$" can be approximated by the formula:

$$\lambda = 3\nu - 1 \quad (4)$$

where $\nu$ is a critical exponent.

A more complete derivation for intrinsic viscosity, which includes the effect of polymer connectivity, may be obtained from a generalized Flory equation and the intrinsic viscosity by Muthukumar.

Terminology d = effective Euclidean dimension
$d_{fs} = 1/\nu$ = swollen fractal dimension of polymer in a given solvent system
$\nu$ = critical exponent related to chain size
s = screening exponent $$\begin{cases} s = 0 & \text{stiff chain} \\ s = 0 & \text{good solvent, flexible chain} \\ s = \frac{1}{2} & \text{poor solvent, flexible chain} \end{cases}$$

$v_{ex}(s) = $ excluded volume $\simeq v_{ex}N^{-s}$
N = number of segments in chain (proportional to $M_w$)
$d_f$ = fractal dimension of polymer for simple random walk (no swelling)
$d_s$ = fracton dimensionality related to polymer connectivity
R = end-to-end length of polymer in solvent system
$R_o$ = end-to-end length of polymer for polymer configured according to simple random walk (poor or $\theta$ solvent)

Mean field approximation to polymer dissolved in solvent:

Elastic free energy $$\frac{F_{elas}}{k_BT} = \left(\frac{R}{R_o}\right)^2 \quad (5)$$

where $k_B$ is the Boltzman Constant

Repulsive energy $$\frac{F_{rep}}{k_BT} = v_{ex}(s,d)\frac{N^2}{R^d} \simeq \frac{v_{ex}(d)}{N^s}\frac{N^2}{R^d} = v_{ex}(d)\frac{N^{2-s}}{R^d} \quad (6)$$

Adding to the terms to obtain $F_{tot}/k_BT$ (total free energy)

$$\frac{F_{tot}}{k_BT} = \left(\frac{R}{R_o}\right)^2 + \frac{v_{ex}N^{2-s}}{R^d} = \left(\frac{R}{R_o}\right)^2 + v_{ex}N^{2-s}R^{-d} \quad (7)$$

Minimizing free energy $$\partial\frac{F_{tot}/k_BT}{\partial R} = \frac{2R}{R_o^2} - v_{ex}N^{2-s}d\,R^{-(d+1)} \quad (8)$$

At equilibrium end-to-end distance in swollen state:

$$\frac{2R_s}{R_o^2} = \frac{v_{ex}N^{2-s}d}{R_s^{d+1}} \text{ or } R_s^{d+2} = \frac{v_{ex}N^{2-s}d}{2}R_o^2 \quad (9)$$

It is also known that $R_o$ (simple random walk) is given by $$R_o = aN^{1/d_f} = aN^\nu \text{ or } R_o^2 = a^2N^{2\nu} \quad (10)$$

Consequently $$R_s^{d+2} = \frac{v_{ex}N^{2-s}da^2N^{2\nu}}{2}$$
$$= \frac{v_{ex}da^2}{2}N^{2(\nu+1)-s}$$

or $$R_s = \left(\frac{v_{ex}da^2}{2}\right)^{\frac{1}{d+2}} N^{[2(\nu+1)-s/(d+2)]} \quad (11)$$

In a manner similar to $R_o$, we may write an expression for the swollen end-to-end distance, i.e., $$R_s = a_sN^{1/d_{fs}} = a_sN^{\nu_s} \quad (12)$$

Consequently, $$a_sN^{\nu_s} = \left(\frac{v_{ex}da^2}{2}\right)^{\frac{1}{d+2}} N^{\left(\frac{2(\nu+1)-s}{d+2}\right)} \quad (13)$$

or $$a_s = \left(\frac{v_{ex}da^2}{2}\right)^{\frac{1}{d+2}}$$

and $$\nu_s = \frac{2(\nu+1)-s}{d+2} \quad (14)$$

This expression relates $\nu_s$ for the swollen state, to $\nu$ for the unswollen state.

The fracton dimensionality for any polymeric fractal is related to $d_f$ by $$d_s = \frac{2d_f}{d_f+2} \text{ (unswollen state)} \quad (15)$$

Rearranging, $$(d_f+2)d_s - 2d_f = 0$$

or $$d_f d_s - 2d_f = -2d_s$$

or $$d_f(d_s - 2) = -2d_s$$

or $$d_f = \left(\frac{2d_s}{2 - d_s}\right) = 1/\nu \quad (16)$$

For linear polymers $d_s = 1$, so that $d_f = 2$.
For gels or randomly cross-linked polymers, $d_s \approx 4/3$, so that $$d_f = \frac{2 \times 4/3}{2/3} = \frac{8/3}{2/3} = 4. \quad (17)$$

Recognizing that $$\nu = \frac{2 - d_s}{2d_s},$$

and substituting in expression for $\nu_s$, we have $$\nu_s = \frac{2\left(\frac{2-d_s}{2d_s} + 1\right) - s}{d+2} \quad (18)$$

$$= \frac{\left(\frac{2-d_s+2d_s}{d_s}\right) - s}{d+2}$$

$$= \frac{\left(\frac{2+d_s}{d_s}\right) - s}{d+2} = \frac{1 + \frac{2}{d_s} - s}{d+2}$$

$$= \frac{(1-s)d_s + 2}{d_s(d+2)}$$

If $s = 0$ (no screening) and $d_s = 1$ (linear chain), the expression for $\nu_s$ reduces to the original Flory definition.

$$\nu_s = \frac{3}{d+2} \quad (19)$$

$$(s = 0, d_s = 1)$$

Note that screening exponent "s" depends on the extent to which a chain folds back on itself. Said another way, close proximity of one chain unit to another tends to screen interactions from other chain units. Consequently, "s" will be determined by interactions with solvent (i.e., does it cause chain to fold back on itself to form tight ball) and by stiffness of chain which causes polymer units to avoid each other. These two effects work simultaneously. Chain stiffness could be evaluated by measuring intrinsic viscosities for differently structured polymers having the same chemical constitution in the same solvent and looking at molecular weight dependence. Solvent effects can be evaluated by dissolving the same polymer in different solvents and determining $[\eta]$.

Now, the intrinsic viscosity has been shown by Muthukumar to be $$[\eta] \approx C(d) \frac{R_s^3}{N} \quad (20)$$

Consequently, $$[\eta] = \frac{C(d)(a_s N^{\nu_s})^3}{N} \quad (21)$$

$$= C(d) a_s^3 N^{[3\nu_s - 1]}$$

$$[\eta] = C(d)\left(\frac{v_{ex}da^2}{2}\right)^{\frac{3}{d+2}} N^{\left(\frac{3[(1-s)d_s+2]}{d_s(d+2)} - 1\right)}$$

or $$[\eta] = K'(d) N^{\left[\frac{3[(1-s)d_s+2]}{d_s(d+2)} - 1\right]}$$

where $$K'(d) = C(d)\left(\frac{v_{ex}da^2}{2}\right)^{\frac{3}{d+2}}$$

and since $M_w = N\, M_s$, ($M_s$ is the segment molecular weight)

$$[\eta] = K'(d)\left(\frac{M_w}{M_s}\right)^{\left[\frac{3[(1-s)d_s+2]}{d_s(d+2)} - 1\right]} \quad (22)$$

or $$[\eta] = K(d,d_s) M_w^{\left[\frac{3(1-s)d_s+6}{d_s(d+2)} - 1\right]}$$

where $$K(d,d_s) = \frac{K'(d)}{M_s^{\left[\frac{3(1-s)d_s+6}{d_s(d+2)} - 1\right]}}$$

Note that $$\frac{3[(1-s)d_s+2]}{d_s(d+2)} - 1 = \frac{3(1-s)d_s + 6 - d_s(d+2)}{d_s(d+2)} = \quad (23)$$

$$\frac{3(1-s) + 6/d_s - (d+2)}{d+2} = \left[\frac{1 + 6/d_s - d - 3s}{d+2}\right]$$

$$\therefore [\eta] = K(d,d_s) M_w^{\left[\frac{1+6/d_s-d-3s}{d+2}\right]} \quad (24)$$

Therefore, a generalized expression for $\lambda$ is:

$$\lambda = \left[\frac{1 + 6/d_s - d - 3s}{d+2}\right] \quad (25)$$

Thus, the dimensionality of a polymer has a major consequence on the effect of molecular weight on intrinsic viscosity.

For instance, for a linear, flexible polymer the values of $d_s$ and $d$ are 1 and 3, respectively. In a poor solvent, $s=0.5$. Thus, the corresponding intrinsic viscosity increases with the square root of the molecular weight.

$$[\eta]_m = K(3,1)M_w^{[\frac{1+6/1-3-3(0.5)}{3+2}]} \tag{26}$$

$$[\eta]_m = K(3,1)M_w^{[\frac{7-4.5}{5}]} = K(3,1)M_w^{[\frac{2.5}{5}]}$$

On the other hand, for a rigid polymer the values of $d_s$ and d are both 1, and s is 0. Thus, the intrinsic viscosity increases with the square of the molecular weight.

$$[\eta]_m = K(1,1)M_w^{[\frac{1+6/1-1-3(0)}{1+2}]} \tag{27}$$

$$[\eta]_m = K(1,1)M_w^{[\frac{7-1}{3}]} = K(1,1)M_w^{2.0}$$

Thus, rigid polymers confined to a single dimension would have much higher intrinsic viscosities than linear, flexible polymers of the same molecular weight Note that although the quantity $K(d_s, d)$ also changes with dimensionality, the principal effect on intrinsic viscosity is due to the change in exponent "λ" on $M_w$.

The "λ" for the polydimethylsiloxanes of Harris et al. is about 0.75 in toluene, which suggests an effective dimensionality of those polymers under those conditions of about 3 with $s=1/12$. The dimensionality of the polymers of the present invention typically will be less than 2, preferably as close to unity as possible while maintaining solubility.

Note that, if the polymer is branched ($d_s>1$), the intrinsic viscosity decreases. For instance, suppose that the rigid polymer had a $d_s$ of 1.2, leaving d and s unchanged, $$[\eta]_m = K(1,1.2)M_w^{[\frac{1+6/1.2-1-3(0)}{1+2}]} \tag{28}$$

$$[\eta]_m = K(1,1.2)M_w^{[\frac{5}{3}]} = K(1,1)M_w^{1.67}$$

Thus, for a given molecular weight and constant d and s, branching of a rigid polymer will generally reduce the viscosity. Branching will also reduce the solubility. Since both of these effects are undesirable, we must strive to minimize both regular and random branching, in as much as possible.

In one preferred embodiment of this invention, this polymer is used in a method for recovering oil from an underground oil-bearing earth formation penetrated by an injection well and a producing well. In that method, carbon dioxide is injected into the formation to displace oil towards the producing well from which the oil is produced to the surface The viscosity of the injected carbon dioxide is increased at least three-fold by the presence of a sufficient amount of an organosilicon polymer having nonrandom crosslinkages and a sufficient amount of a cosolvent to form a solution of the polymer in the carbon dioxide.

Polymer

The polymer of the present invention is an organosilicon polymer having nonrandom crosslinkages that enhance backbone rigidity. That organosilicon polymer having nonrandom crosslinkages can have an ordered network that is predominantly sheet-like or that ordered network can be a double chain or that ordered network can comprise segments that are both double-chained and sheet-like.

Double-chain organosilicon polymers, such as polyalkylsilsesquioxanes, are preferred because of their high intrinsic viscosity. Preferably, the polyalkylsilsesquioxane is either polymethylsilsesquioxane or a polysilsesquioxane which has methyl side groups mixed with either ethyl or phenyl side groups or both. In one embodiment, the polyalkylsilsesquioxane contains less than 25% phenyl side groups. More preferably, the polyalkylsilsesquioxane is polymethyl-silsesquioxane. Polymethylsilsesquioxane has an estimated solubility parameter of 15.2 $J^{\frac{1}{2}}/cm^{3/2}$, which is close to the 14.0 $J^{\frac{1}{2}}/cm^{3/2}$ solubility parameter for carbon dioxide at 30° C. and 3500 psia cited by Harris et al. For comparison, the solubility parameter of polydimethylsiloxanes is estimated here to be about 15.3 $J^{\frac{1}{2}}/cm^{3/2}$. The chemical formula of the repeating unit of polymethylsilsesquioxane is:

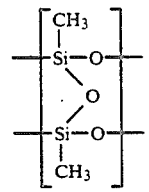

The chemical formula of the repeating unit of polymethylethylsilsesquioxane is:

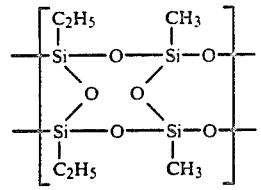

The polymethylethylsilsesquioxane polymer should be moderately soluble in carbon dioxide co-solvent since its solubility parameter is estimated to be about 15.4.

Another double-chain organosilicon polymer that would work has an estimated solubility parameter of 15.2 $J^{\frac{1}{2}}/cm^{3/2}$, which is close to the 15.3 $J^{\frac{1}{2}}/cm^{3/2}$ solubility parameter of the polydimethylsiloxanes of Harris et al. That polymer has the following repeating unit:

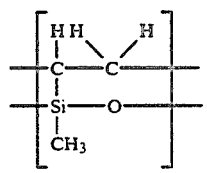

A more generalized form of that polymer, which would work, has the following repeating unit:

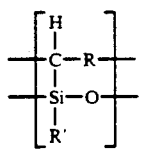

where:

R is either methylene, ethylene, or a combination thereof; and

R' is either methyl, ethyl, phenyl, or a combination thereof.

Another double-chain organosilicon polymer that would work has the following repeating unit:

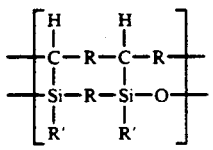

where:

R is either methylene, ethylene, or a combination thereof; and

R' is either methyl, ethyl, phenyl, or a combination thereof.

Still another double-chain organosilicon polymer that would work has the following repeating unit:

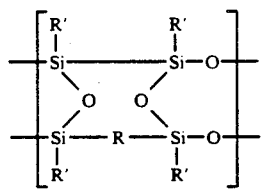

where:

R is either methylene, ethylene, or a combination thereof; and

R' is either methyl, ethyl, phenyl, or a combination thereof.

Another double-chain organosilicon polymer that would work has the following repeating unit:

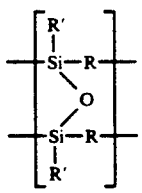

where:

R is either methylene, ethylene, or a combination thereof; and

R' is either methyl, ethyl, phenyl, or a combination thereof.

The preparation of organosilsesquioxanes is well known in the art. For instance, it is disclosed in U.S. Pat. Nos. 3,450,672 and 3,294,737, both of which are hereby incorporated by reference for all purposes. It is also disclosed in John Browns article "Double Chain Polymers and Nonrandom Crosslinking," *Journal of Polymer Science: Part C*, No. 1, pp. 83–97 (1963), which is also hereby incorporated by reference for all purposes.

Carbon Dioxide

The carbon dioxide can come from any suitable source, such as those described in "Miscible Displacement" by Fred I. Stalkup, Jr. (Monograph Vol. 8, Henry L. Doherty Series, ISBN NO895203197, Society of Petroleum Engineers, 1983, Chap. 8, sec. 8.4). Substantially pure carbon dioxide is preferred, but water-saturated carbon dioxide is acceptable since water (or brine) is usually present in the formation. Usually, the carbon dioxide contains at least 95% carbon dioxide and preferably at least 98% carbon dioxide, the remainder being usually light hydrocarbons. The amount of impurities in the carbon dioxide which can be tolerated is a function of the type of oil to be displaced and the type of displacement operation.

Cosolvent

As a class, it would appear that many materials are suitable for use as cosolvents in this invention, such as:

(a) alcohols having from 1 to 8 carbon atoms, (b) aromatics having a single ring and from 6 to 10 carbon atoms, (c) ketones having from 3 to 10 carbon atoms, (d) carboxylic acid esters where the carboxylic acid portion has from 2 to 4 carbon atoms and the ester portion has from 1 to 10 carbon atoms, and (e) hydrocarbons having from 3 to 20 carbon atoms, including refinery streams such as naphthas, kerosene, gas oils, gasolines, aromatic cuts, etc.

If hydrocarbons are used, preferably they are aliphatic, naphthenic, or aromatic hydrocarbons having from 2 to 10 carbon atoms.

One technique for obtaining the desired cosolvent on-site is to contact the carbon dioxide in a liquid-liquid extraction apparatus with recovered crude or a fraction of such crude for a sufficient time to permit the carbon dioxide to extract enough light hydrocarbons to function as the cosolvent. The desired amount of polymer would then be added to the carbon dioxide-light hydrocarbon extract to form the oil-driving material.

The polymer-cosolvent-carbon dioxide mixture must be compatible with the formation so that the polymer won't precipitate in the formation after injection.

Amounts Of Carbon Dioxide, Polymer, and Cosolvent

The new compositions of this invention comprise from 70 to 9.9 weight percent carbon dioxide and a sufficient amount of a mixture of a polymer and a cosolvent to effect at least a three-fold increase in the viscosity of the carbon dioxide. Usually the weight percent polymer in the mixture is from 0.05 to 20 weight percent. The amount of cosolvent is at least sufficient to dissolve the desired amount of polymer in the carbon dioxide and is at least 40% by weight of the polymer employed. This amount of cosolvent is usually from 0.05 to 30 weight percent of the final mixture.

One method of preparing the viscous carbon dioxide solution is by first forming a solution of the polymer and cosolvent and then mixing carbon dioxide with the polymer-cosolvent solution. In some cases, the viscous carbon dioxide is displaced through the formation by a drive fluid which is comprised of slugs of viscous carbon dioxide alternated with slugs of a fluid comprising water or reservoir brine.

While the present invention has been described with reference to specific embodiments, this application is intended to cover those various changes and substitutions which may be made by those skilled in the art without departing from the spirit and scope of the appended claims.

What is claimed is:

1. A composition comprising a solution of carbon dioxide, a cosolvent, and a polymer,
   (a) wherein said polymer comprises an organosilicon double-chain polymer having nonrandom crosslinkages that enhance backbone rigidity and
   (b) wherein said cosolvent is selected from the group consisting of:
      (1) alcohols having from 1 to 8 carbon atoms,
      (2) aromatics having a single ring and from 6 to 10 carbon atoms,
      (3) ketones having from 3 to 10 carbon atoms,
      (4) carboxylic acid esters where the carboxylic acid portion has from 2 to 4 carbon atoms and the ester portion has from 1 to 10 carbon atoms, and
      (5) hydrocarbons having from 3 to 20 carbon atoms.

2. The composition according to claim 1 wherein said nonrandom crosslinkages form double-chained segments.

3. The composition according to claim 2 wherein said polymer is a polyalkylsilsesquioxane.

4. The composition according to claim 3 wherein said polymer is selected from the group consisting of polymethylsilsesquioxane and a polysilsesquioxane having methyl side groups and side groups selected from the group consisting of ethyl, phenyl, and combinations thereof.

5. The composition according to claim 4 wherein said polymer is polymethylsilsesquioxane.

6. The composition according to claim 4 wherein said polymer is a polysilsesquioxane having methyl side groups and ethyl side groups.

7. The composition according to claim 4 wherein said polymer is a polysilsesquioxane having methyl side groups and phenyl side groups wherein less than 25% of the side groups are phenyl.

8. The composition according to claim 2 wherein said polymer has the following repeating unit:

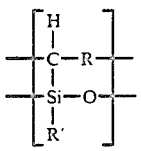

wherein R is selected from the group consisting of methylene, ethylene, and combinations thereof; and wherein R' is selected from the group consisting of methyl, ethyl, phenyl, and combinations thereof.

9. The composition according to claim 2 wherein said polymer has the following repeating unit:

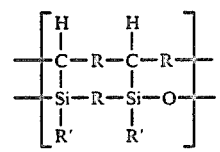

wherein R is selected from the group consisting of methylene, ethylene, and combinations thereof, and wherein R' is selected from the group consisting of methyl, ethyl, phenyl, and combinations thereof.

10. The composition according to claim 2 wherein said polymer has the following repeating unit:

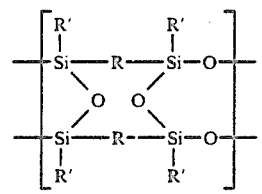

wherein R is selected from the group consisting of methylene, ethylene, and combinations thereof; and wherein R' is selected from the group consisting of methyl, ethyl, phenyl, and combinations thereof.

11. The composition according to claim 2 wherein said polymer has the following repeating unit:

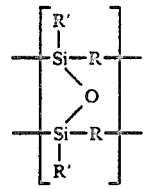

wherein R is selected from the group consisting of methylene, ethylene, and combinations thereof; and wherein R' is selected from the group consisting of methyl, ethyl, phenyl, and combinations thereof.

* * * * *